United States Patent
Garner

(10) Patent No.: US 9,892,473 B1
(45) Date of Patent: Feb. 13, 2018

(54) ELECTRONIC RUN TICKET

(71) Applicant: Robert P. Garner, Ogden, UT (US)

(72) Inventor: Robert P. Garner, Ogden, UT (US)

( * ) Notice: Subject to any disclaimer, the term of this patent is extended or adjusted under 35 U.S.C. 154(b) by 401 days.

(21) Appl. No.: 14/667,585

(22) Filed: Mar. 24, 2015

Related U.S. Application Data

(63) Continuation of application No. 14/106,159, filed on Dec. 13, 2013, now abandoned.

(51) Int. Cl.
| | | |
|---|---|---|
| G06G 1/14 | (2006.01) | |
| G06Q 50/06 | (2012.01) | |
| G06Q 20/04 | (2012.01) | |
| G06F 17/24 | (2006.01) | |
| B65B 1/30 | (2006.01) | |
| G06Q 30/00 | (2012.01) | |

(52) U.S. Cl.
CPC ........... *G06Q 50/06* (2013.01); *G06F 17/243* (2013.01); *G06Q 20/0453* (2013.01)

(58) Field of Classification Search
USPC .......................................................... 705/22
See application file for complete search history.

(56) References Cited

U.S. PATENT DOCUMENTS

| | | | | | |
|---|---|---|---|---|---|
| 4,523,460 | A * | 6/1985 | Strickler | ............... | G01F 15/007 340/870.11 |
| 4,551,719 | A * | 11/1985 | Carlin | ...................... | B67D 7/32 340/3.32 |
| 5,333,498 | A * | 8/1994 | Brackett | .................. | B67D 7/08 73/198 |
| 5,349,994 | A * | 9/1994 | Koeninger | ............... | B67D 7/08 137/351 |
| 5,471,867 | A * | 12/1995 | Tuma | .................. | G01M 3/2892 73/290 R |
| 5,579,233 | A * | 11/1996 | Burns | ..................... | B67D 7/145 221/23 |
| 5,821,406 | A * | 10/1998 | Ridgeway | ................. | B67D 7/04 73/53.05 |
| 5,913,180 | A * | 6/1999 | Ryan | ..................... | B67D 7/145 235/375 |
| 6,047,250 | A * | 4/2000 | Beaudoin | ................ | G01F 1/065 455/517 |
| 6,481,627 | B1 * | 11/2002 | Guerreri | ................ | B67D 7/145 235/470 |
| 6,868,401 | B1 * | 3/2005 | Carpenter | .............. | G06Q 40/04 705/37 |
| 6,934,644 | B2 * | 8/2005 | Rogers | ..................... | B67D 7/08 702/33 |
| 7,178,561 | B2 * | 2/2007 | Memmott | ............ | B67D 7/3209 141/1 |
| 7,805,340 | B2 * | 9/2010 | Blakeslee | ................ | B67D 7/08 705/22 |
| 8,146,657 | B1 * | 4/2012 | Gibbs | ..................... | E21B 49/00 166/250.03 |
| 8,805,592 | B1 * | 8/2014 | Booth | .................. | B67D 7/3209 141/2 |

(Continued)

*Primary Examiner* — Ashford S Hayles

(74) *Attorney, Agent, or Firm* — Thorpe North & Western

(57) ABSTRACT

Technology for completing an electronic run ticket is provided. In an example method, user credentials may be received on a client device. A barcode associated with an oil tank may be scanned to identify the oil tank. Fields of the electronic run ticket may be populated based on the identification of the oil tank. Fields of the electronic run ticket may also be populated based on the user credentials.

20 Claims, 8 Drawing Sheets

(56) References Cited

U.S. PATENT DOCUMENTS

| | | | | |
|---|---|---|---|---|
| 2002/0143478 A1* | 10/2002 | Vanderah | G01D 9/005 | 702/45 |
| 2003/0183382 A1* | 10/2003 | Newman | E21B 37/00 | 166/66 |
| 2004/0045623 A1* | 3/2004 | Parker, III | G06Q 10/08 | 141/1 |
| 2005/0010462 A1* | 1/2005 | Dausch | G06Q 10/06 | 700/271 |
| 2006/0157144 A1* | 7/2006 | Hillam | B67D 7/3209 | 141/198 |
| 2006/0157145 A1* | 7/2006 | Hillam | B67D 7/3209 | 141/198 |
| 2006/0157146 A1* | 7/2006 | Hillam | B67D 7/222 | 141/198 |
| 2006/0157147 A1* | 7/2006 | Hillam | B67D 7/222 | 141/198 |
| 2006/0157148 A1* | 7/2006 | Hillam | B67D 7/222 | 141/198 |
| 2006/0157149 A1* | 7/2006 | Hillam | B67D 7/222 | 141/198 |
| 2007/0241860 A1* | 10/2007 | Nishimura | G06Q 10/087 | 340/5.9 |
| 2008/0119284 A1 | 5/2008 | Luciano, Jr. et al. | | |
| 2008/0120036 A1* | 5/2008 | Kimminau | E21B 47/065 | 702/12 |
| 2010/0089486 A1* | 4/2010 | Koeninger | B67D 7/3209 | 141/2 |
| 2010/0185334 A1* | 7/2010 | Trottier | B67D 7/3209 | 700/281 |
| 2011/0120589 A1* | 5/2011 | Evans | B67D 7/348 | 141/1 |
| 2011/0130882 A1* | 6/2011 | Perez | G01N 33/2835 | 700/282 |
| 2012/0054270 A1* | 3/2012 | Foreman | G06Q 10/10 | 709/203 |
| 2013/0096961 A1 | 4/2013 | Owens et al. | | |
| 2013/0124113 A1* | 5/2013 | van Dal | G06F 19/00 | 702/45 |
| 2013/0291999 A1* | 11/2013 | Orcutt | B67D 7/145 | 141/1 |
| 2014/0157172 A1* | 6/2014 | Peery | G06Q 50/02 | 715/771 |
| 2014/0195453 A1* | 7/2014 | Richie | G06Q 10/0832 | 705/332 |
| 2014/0195454 A1* | 7/2014 | Richie | G06Q 10/0833 | 705/333 |
| 2014/0316589 A1* | 10/2014 | Lichtash | B67D 7/346 | 700/282 |
| 2014/0350736 A1* | 11/2014 | McMillan | G05D 7/0676 | 700/282 |
| 2015/0177051 A1* | 6/2015 | Hudson | G01F 25/0061 | 73/1.74 |
| 2016/0154410 A1* | 6/2016 | Armitage | B67D 7/3236 | 137/2 |
| 2016/0180475 A1 | 6/2016 | Phillips et al. | | |

* cited by examiner

Whole Tank Run Ticket

| Lease/ PAD Name | | | | Date | |
|---|---|---|---|---|---|
| Field Name | Field Operator | COC Federal / Indian Lsc. # | | Time | |
| Legal Description | | | County | | State |
| Tank # | Tank Capacity | | Lease # | | |

| | Feet | Inches | Fraction | Tank Temp. | Gross BBLS |
|---|---|---|---|---|---|
| OPEN | | | | | |
| | Feet | Inches | Fraction | Tank Temp. | Gross BBLS |
| CLOSED | | | | | |
| OBS Gravity | OBS Temp | BS&W | BS&W Depth | Split with Tkt # | Total Gross BBLS |
| | | | | | |

| | Tank Sales Valve | | Production Inlet Valve | Equalizing / Overflow Valve |
|---|---|---|---|---|
| Opening Seal # | | Open Seal # | | |
| Closing Seal # | | Close Seal # | | |
| | | Re-Open Seal # | | |

| Trucking Comp. | Driver's Printed Name | Driver's Signature | |
|---|---|---|---|
| Destination | Destination Facility Operator | For the Account of: | Bill of Lading # |
| Producer Representative Signature | | | Date |

Remarks:

FIG. 1
*(prior art)*

ELECTRONIC RUN TICKET

PRIORITY DATA

This application is a continuation of U.S. patent application Ser. No. 14/106,159, filed Dec. 13, 2013, which is incorporated herein by reference.

BACKGROUND

Oil and gas are measured when produced or sold. When fluid is produced from oil and treated, a resultant crude may be stored in a tank or tank battery. A volume of the tank may be known and an amount of oil in the tank may be calculated in terms of a number of barrels (where one barrel is equivalent to 42 U.S. gallons) using height intervals on the tank. The oil may be put into the tank through a top of the tank and sold or dispensed through an opening near a bottom of the tank.

When a truck driver arrives to obtain oil from the tank into a tanker truck, various information regarding the tank and the oil may be notated on a paper document to record the conditions and amount of oil dispensed. For example, a measuring tape or the like may be used by inserting the tape into the tank from the top until the tape reaches the bottom, where an oil level may be determined by viewing the level on the tape. As another example, the oil may be tested to determine characteristics of the oil, such as a gravity of the oil, a temperature of the oil, a basic sediment and water (BS&W) content of the oil, and so forth. A document commonly referred to as a "run ticket" may be used to record the various tank and oil information.

A run ticket is used in buying and selling crude oil. When the ownership or custody of oil changes, a run ticket may be prepared for the receiver and the shipper to record the transaction. A run ticket may refer to evidence of receipt or delivery of oil issued by a pipeline, other carrier, or purchaser. An amount of oil transferred or dispensed from the tank may be recorded on a run ticket. The amount of payment for oil may be based upon information contained in the run ticket. The run ticket may include information such as an opening and closing gauge on the tank, API gravity and temperature of the oil, BS&W of the oil and so forth. A copy of the run ticket may be presented or available to a purchaser, a pumper and a gauger.

BRIEF DESCRIPTION OF THE DRAWINGS

FIG. 1 is an illustration of a conventional run ticket used to record an oil transaction in accordance with the prior art.

DETAILED DESCRIPTION

Figure 2:
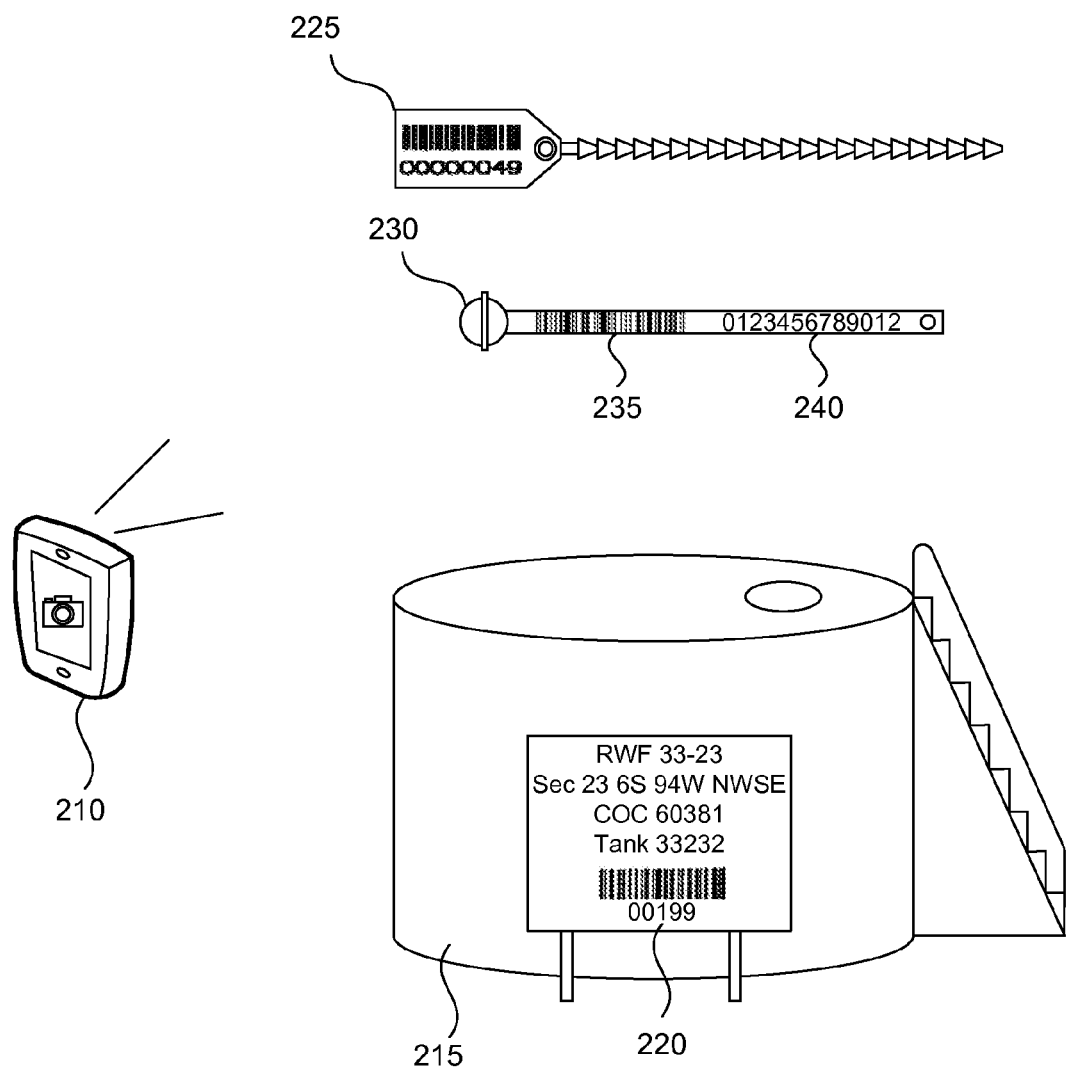
FIG. 2 illustrates a mobile device for capturing identification information on a tank and a valve seal in accordance with an example of the present technology.

Technology for completing an electronic run ticket is provided. In an example method, user credentials may be received on a client device. A barcode associated with an oil tank may be scanned to identify the oil tank. Fields of the electronic run ticket may be populated based on the identification of the oil tank. Fields of the electronic run ticket may also be populated based on the user credentials.

Oil is measured when produced or sold. When fluid is produced from oil and treated, a resultant crude may be stored in a tank or tank battery on a lease. Tank batteries often have a storage capacity of up to several days of production. Each tank in a tank battery is strapped, meaning that the dimensions of the tank are determined and the volume of oil (in barrels) that a tank can hold is calculated at height intervals, such as in ¼ inch or other intervals.

The oil may enter a tank through an opening at the top of the tank and may be sold or delivered to a tank truck, barge, pipeline or the like through an opening near the bottom of the tank. The delivered oil may be measured by gauging the height of the oil in the tank both before and after delivery of the oil. A tank gauger (who may be the truck driver) may determine the height of the oil in the tank by lowering a steel tape with a plumb bob on the end into the tank. When the tape touches the tank bottom, the tape is withdrawn and the gauger notes the oil level on the tape.

The unit of measure of oil is a barrel, which is 42 U.S. gallons. Before oil is sold, the oil measurement may be recorded in terms of BS&W. In addition, the API gravity of the oil may be determined for a standard temperature of 60° Fahrenheit (F). Gravity, as used herein, may refer to degree of gravity on the American Petroleum Institute (API) scale and is a measure of the specific gravity or density of crude oil or condensate in comparison to water. API gravity is determined after adjusting measurements made at the actual temperature of the petroleum liquid (i.e., crude oil and condensate) to a standard temperature of 60° F. Crude oil expands as it is heated and contracts when it is cooled. Different API gravity crude oils expand and contract at different rates at any given temperature; as such all crude oils are temperature corrected before measurement to 60° F. to create a constant when determining volume. On this API scale, the greater the density of the petroleum liquid (or the heavier the liquid), the lower the API gravity. The API gravity of petroleum liquid is useful in determining the sales value of the crude or condensate, because the lighter petroleum liquids (i.e., those with a higher API gravity) typically have different yield values within a refinery, thus affecting the value of the crude when compared with heavier petroleum crude oils (i.e., those that have a lower API gravity).

The volume of oil sold may be converted to standard conditions by using the characteristics of the oil sold. i.e. the gravity, temperature, and BS&W. Thus, in addition to measuring the amount of oil delivered, the oil may also be tested to determine its characteristics. A container known as a "thief" may be used to obtain samples of the oil at various levels in the tank. These samples may be analyzed, such as in a centrifuge, to determine BS&W content, the gravity of the oil, and the temperature. In addition, the temperature of the oil in the tank may be taken both before and after the run. These two temperature readings may be used to correct the volume of the fluid in the tank before and after the run to a standard condition of 60° F. The temperature of the oil from the oil sample may be used to correct the observed gravity at the observed temperature to the API gravity at standard temperature. i.e., 60° F. The BS&W factor may be used to convert gross barrels of oil delivered to barrels net of BS&W content, at API standard.

The BS&W, gravity, temperature, the number of barrels of oil removed from a tank, and the calculations converting the barrels to standard conditions may be conventionally recorded on a paper run ticket to determine the actual volume of oil purchased. The run ticket is a source document for recording the amount of oil sold. FIG. 1 illustrates a conventional run ticket.

When the oil is sold, the gauger representing the buyer, observed by the lease pumper, may measure the oil removed and determine the characteristics of the oil. When the amount of oil removed from the tank and the oil's characteristics have been recorded on the run ticket, at least one or both of the gauger representing the buyer and the lease pumper may sign the ticket.

The data entered on a run ticket is used to determine the volume of oil released from a storage tank or flowed through a meter. The process used to complete a run ticket and determine the net volume from a tank run is described. At the time a tank is installed, it is strapped and assigned a unique number. This number, which is placed on the run ticket, indicates the specific tank from which the oil is released and a strapping table that corresponds with that specific tank and indicates the volumetric characteristics of the tank. This table will be used to convert the feet and inches measurement on the run ticket into a run volume from the tank expressed in barrels.

The level of oil in the tank and the temperature of the oil are measured at the beginning and at the end of the run. For example, the beginning level may be 13'0" and the ending level may be 1'4". Each of these measurements, which are in feet and inches (down to ⅛ or ¼ inch increments, typically depending on a volume capacity of the tank), may then be converted to a volume in barrels using the appropriate tank table. A thief may be used to collect a sample of the oil. In addition to temperature, BS&W, and gravity, the volume of oil sold may be adjusted to a standard temperature of 60° F., and the observed gravity may also be adjusted to a true gravity based on the observed temperature of the sample.

A true gravity may be determined using the observed gravity and observed temperature of the oil during the run. The true gravity, which is the observed gravity corrected for temperature, may be determined using a gravity temperature correction table.

The number of barrels in the tank at the beginning of the run may be adjusted to standard temperature by referring to a table. Using the true gravity and the temperature of the oil at the beginning of the run, a correction factor may be obtained from the table. The number of barrels in the tank at the end of the run may also be corrected for temperature. The second correction factor for the number of barrels in the tank at the end of the run, also taken from the table, may be determined using the true gravity and the temperature of the oil at the end of the run. The factors from the table are multiplied by the volumes of oil before and after the run to get the number of barrels adjusted to standard temperature. The adjusted number of barrels at the beginning of the run and at the end of the run may then be subtracted to obtain a gross measured volume.

The measured volume, now corrected for gravity and temperature, may be multiplied by the correction factor for BS&W to determine the net barrels.

Other items included on the run ticket may include information about the oil lease, information about the truck driver, sales valve seal numbers and so forth. For example, the lease information may include a lease name, lease number, field name, field operator, federal license, location and so forth. The driver information may include the trucking company, the driver's printed name as well as signature, the destination, the destination facility operator, the account for which the oil was purchased, a bill of lading number, and any remarks or comments. The bill of lading may originate with the trucking company and may include or be associated with a description of the product, quantity purchased or hauled, etc., and may have a bill of lading number associated therewith.

The present technology may be used for completing an electronic run ticket, submitting the electronic run ticket, and managing the data from the electronic run ticket after submission. In an example method, user credentials may be received on a client device. A barcode associated with an oil tank may be scanned to identify the oil tank. Fields of the electronic run ticket may be populated based on the identification of the oil tank. Fields of the electronic run ticket may also be populated based on the user credentials.

The user (e.g., truck driver) may be prompted to enter data, such as email address, first name, last name, trucking company and so forth when using the technology. Additionally, the user may be prompted provide a signature. The technology may be implemented, at least in part, as an application or "app" for a smartphone, tablet or other mobile device, for example. Thus, the user data may be input into the mobile device using a touch screen interface, using voice commands, and so forth. For the signature, the user may be asked to sign their name as if signing on paper, such as by using a finger, stylus or other suitable input device. The user may further be assigned a PIN (Personal Identification Number) or be asked to input a PIN to use for security purposes for logging into the application. Information input by the user may be stored locally on the mobile device as well as transmitted to another device, such as a management server.

When the user visits an oil lease to purchase oil, the user may be asked to provide an authentication number or code in addition to the PIN to login and register to use the application. The authentication number may be provided to the user, such as by the actual purchaser of the oil or by the trucking company employing the user. In one example, the trucking company may generate the authentication number for a driver when a purchaser, marketer, producer or other entity requests the trucking company to transport oil. The authentication number may be a number specific to an individual truck driver. The user may be prompted to enter the authentication code for registration, along with other user data, such as a name and email address for example. The user may then be prompted to create the PIN and provide a signature for future logins. The user may be presented with terms of use of use of the electronic run ticket technology and may be prompted to sign to accept the terms, such as by signing on an electronic device touch sensitive display screen using a finger or stylus for example. For future access to the electronic run ticket technology, the user may use the PIN created previously, and may optionally use additional information such as a username, email address or other user data.

When the PIN is entered, the electronic run ticket technology may synchronize data between a management server and the device. Data synchronized with the device may be based on permissions associated with the user (as identified by the PIN). For example, based on the permissions and PIN, the device may download lease information, such as a lease operator, legal description of the lease, tank numbers, COC number, county, state, etc. of the lease. Furthermore, the device may synchronize the driver or user name, trucking company and so forth. Based on the authorization code entered the synchronized data may be specific to regional areas.

The synchronized or downloaded data may be pre-populated into an electronic run ticket for subsequent use when the driver arrives at the lease location or may simply be stored in a memory or data storage for subsequent use in populating various fields of the electronic run ticket. For example, when the driver arrives at the lease, the driver may select to create an electronic run ticket, which may generate a run ticket number. The driver may scan a barcode on a tank, for example, and based on the barcode, the electronic run ticket may be populated with data previously or currently synchronized with or downloaded to the device. Each tank in the industry may be associated with a unique number and/or barcode or other identifier. Scanning the barcode may thus accurately identify the lease details and specific tank details.

The driver may be prompted to review the data populated into the electronic run ticket and confirm the accuracy of the data. The driver may scan or enter seal identification numbers, such as sales, production, and/or equalizing valve seal numbers when breaking the seals to dispense oil and/or when re-sealing the valves. The driver may enter a destination for the oil, such as from a drop down list or by typing the destination using a physical or virtual keyboard associated with the mobile device. The driver may further indicate the account for which the oil is being purchased, as well as any remarks, etc.

The electronic run ticket may include a checkbox, dropdown selection menu or other input element by which the driver may indicate whether there was a witness present when the oil was dispensed, such as a representative of the BLM or of a producer. If the driver indicates that the witness was present, the mobile device may open comment box for display for the driver to indicate a name or identity of the witness and the affiliation or role of the witness.

When data entered into the run ticket has been completed and the driver wishes to submit the data, the driver may again be prompted to enter the PIN and confirm that the data is correct before the data is transmitted to the management server. The data may be transmitted when the PIN is entered and the accuracy of the data is confirmed or may be transmitted subsequently, as will be described in further detail below.

In one aspect, the mobile device may save the electronic run ticket to a storage of the device when the PIN is entered and may ask the user whether to attempt to send the electronic run ticket to the management server. When the electronic run ticket data has been successfully saved and/or transmitted, the mobile device may emit an audio confirmation indicating completion of the process and/or may display a textual or other visual confirmation on a display of the device.

The driver may be enabled to review any of at least the last couple of electronic run tickets submitted. The driver may be permitted to edit at least some fields of the electronic run ticket after completion of the electronic run ticket, such as by editing or adding comments to the electronic run ticket, modifying a destination of the delivery, etc. For example, if the driver is heading to a destination and the destination is changed for whatever reason, the driver may add comments to the electronic run ticket explaining a reason for detainment or redirection of the oil. The driver may then resubmit the electronic run ticket to the management server. Some data may be locked from editing, such as gauge data, for example. Some data may be locked from editing when the electronic run ticket is revisited post-completion of the run ticket, but may be available for editing if the electronic run ticket has not been initially completed or submitted. In other words, some of the data may be available for correction by the driver while on location at the lease. If the driver subsequently determines that wrong data was entered into the electronic run ticket, a new electronic run ticket may be created or a separate corrections ticket may be submitted to a producer, marketer or other entity to modify via the management server. In other words, once the electronic run ticket has been completed, at least some portions of the electronic run ticket may be considered an original document to remain unedited. Driver comments, destinations, and the like may be considered separate from the original document and may thus be editable.

Referring to FIG. 2, a mobile device 210 is illustrated which may be used to capture images using a camera included with or attached to the mobile device. In this example, the camera may be used to capture images of barcodes, or simply to scan and recognize barcodes. When barcodes are used, the mobile device may optionally be or include a laser barcode scanner as opposed to a camera. The use of barcodes may be to simplify and ensure accuracy of data entry for the oil transaction. Any one or more of a variety of barcode formats or types may be used individually or in combination, such as including, but not limited to: linear barcodes such as Codabar, Code 25—Non-interleaved, Code 25—Interleaved, Code 11, Code 39, Code 93, Code 128, Code 128A, Code 128B, Code 128C, CPC Binary, DUN 14, EAN 2, EAN 5, EAN-8, EAN-13, Facing Identification Mark, GS1-128 (formerly named UCC/EAN-128), GS1 DataBar (formerly Reduced Space Symbology (RSS)), HIBC (HIBCC Health Industry Bar Code), Intelligent Mail barcode, ITF-14, JAN, Latent image barcode, MSI, Pharmacode, PLANET, Plessey, PostBar, POSTNET, RM4SCC/KIX, Telepen, or UPC; and matrix barcodes such as 3-DI, ArrayTag, AugTag, Aztec Code, Small Aztec Code, Codablock, Code 1, Code 16K, Code 49, ColorCode, Color Construct Code, Compact Matrix Code, CP Code, CyberCode, d-touch, DataGlyphs, Data Matrix, Datastrip Code, digital paper, Dot Code A, EZcode, Grid Matrix Code, HD Barcode, High Capacity Color Barcode, HueCode, INTACTA.CODE, InterCode, JAGTAG, MaxiCode, mCode, MiniCode, MicroPDF417, MMCC, NexCode®, Nintendo e-Reader#Dot code, Optar, PaperDisk, PDF417, PDMark, QR Code, QuickMark Code, Secure Seal, SmartCode, Snowflake Code, ShotCode, SPARQCode, SuperCode, Trillcode, UltraCode, UnisCode, VeriCode, VSCode, or WaterCode.

Barcodes represent an example implementation for use in completing an electronic run ticket, but other technologies may also be used in the alternative or in addition to the barcode technology. For example, a low-power wireless technology may be used to communicate data to the mobile device, such as, near field communication (NFC), Bluetooth, RFID, ZigBee, WiFi and so forth may be used. As a specific implementation example, rather than scanning barcodes using the mobile device, the mobile device may be placed near to an NFC equipped structure or device and may obtain the data to populate the data fields via NFC. Any of a wide variety of other technologies not listed here may also be used to facilitate electronic identification of data for use in populating the data fields. Also, while this disclosure primarily describes the mobile device 210 as performing recognition or identification of a tank, seal number, etc., a system may be implemented whereby detected or scanned data may be uploaded for recognition or identification and the identified data may be transmitted back to the mobile device for populating data fields of the electronic run ticket.

In the example illustrated in FIG. 2, a mobile device 210 may be used to recognize a barcode 220 associated with a tank 215 at an oil field. The barcode may be on the tank, on a sign adjacent to the tank or in any other suitable location where the association of the barcode with the tank may be recognized. When the barcode is scanned, information such as the lease name, field name, field operator, federal license number, legal description, county, state, tank number, tank capacity, lease number and so forth may be populated in the data fields. For example, the data may be stored in a data store on the mobile device and a lookup for the data may be performed when the barcode is recognized based on an identifier encoded in the barcode.

Various data fields, such as the open and close depths, tank temperature, BS&W, etc. may be used for data that is to be measured or recorded at the time of a transaction. Because electronic devices or anything that may cause a spark, flame or other source of combustion are not used when measuring the depth of the oil in the tank, some data may be recorded on a piece of paper and subsequently entered into the data fields in the application. Such data may be input manually by the user. However, in one example, a standard paper form may be used for the user to record the data manually. Subsequently, the mobile device may use a camera to capture an image of the standard form, to recognize the data recorded, and to populate the data fields automatically and without manual input of the data into the mobile device. The process of capturing the image, recognizing the data and populating the fields may be performed locally at the mobile device. In another example, the image may be uploaded to a remote server to recognize the data and then delivered back to the mobile device for automatic inclusion in the data for the transaction. In yet another example, the image may be uploaded to a remote server to recognize the data and the data from the image may be combined with the remainder of the electronic run ticket data by the remote server after the transaction is complete and the electronic run ticket is submitted. In this example, the submitted electronic run ticket may include less data than may be in a conventional run ticket, but the missing data is subsequently combined with the submitted data to complete the run ticket.

When dispensing oil from a tank, various valves may be operated, such as a tank sales valve, a production valve, and an equalizing valve, for example. Seals may be used to secure the valves. A seal may refer to a device, uniquely numbered, which completely secures either a valve or those components of a measuring system that affect the quality and/or quantity of the fluid being measured. Valves may refer to a component of a piping system that may provide access to stored or produced oil, such as fill lines, equalizer or overflow lines, sales lines, circulating lines, and drain lines. Valves are to be closed and sealed after being opened and used. Sealing a valve refers to the placement of a seal in such a manner that the position of the sealed valve may not be altered, or a component in a measuring system affecting quality or quantity may not be accessed, without the seal being destroyed. A run ticket include may include fields to record seal numbers for the valves for operations such as opening, closing, re-opening and so forth. A seal may be recorded and then broken, or broken and then recorded when a valve is opened. Similarly, a seal may be recorded and then used to seal the valve, or used to seal the valve and subsequently be recorded, when a valve is closed.

FIG. 2 illustrates a couple of example seals 225, 230 that may be used to seal a valve by inserting a narrow end through a hole associated with the valve and looping the narrow end back toward the wider end to affix to the wider end. Any of a variety of types of seals may be used. The seals of FIG. 2 include a barcode 235 printed, stamped or otherwise formed on the seal that may encode the seal number 240 also printed or stamped on the seal. The barcode may be recognized by the mobile device and the encoded seal number may be input by the mobile device into the appropriate data field.

Whether for recording seal numbers, tank identification numbers or other data, the application may enable manual input of the data if the barcode is missing or unreadable. By using barcodes or other suitable technology to populate data in the electronic run ticket, a driver can save a significant amount of time in recording data and verifying accuracy of the data. Additionally, human error due to typographical errors, confusion, letter/number transposition, etc. may be largely eliminated.

As an additional benefit, the recorded data may be uploaded to a management server and accessed or managed by various entities, such as the oil producer, the trucking company, the trucker (i.e., the "user"), the Bureau of Land Management (BLM), the purchaser and so forth. Because the data is electronic and may be electronically submitted, the current method of faxing written forms followed by data transcription from the written copy may be eliminated. Additionally, there is a necessary delay and added degree of complexity for a driver to find and use a fax machine, as well as the introduction of errors due to failed faxes, poor quality faxes, mis-transcription of data and so forth. Information gathered at the lease may be transmitted by the user and received by a cloud server, which may be a part of the electronic run ticket system. The information may then be fully mathematically calculated/evaluated and corrected for temperature and API gravity. Also, an exact net volume of oil removed from the individual tank may be determined based on the tank's known actual capacity, as may be stored in a data store for the cloud server. It is estimated that accounting personnel used for management of conventional run tickets may be reduced by up to 50% or more through implementation of an electronic run ticket as set forth herein, such as for the reasons set forth above and reasons that may be further described later.

Figure 3:
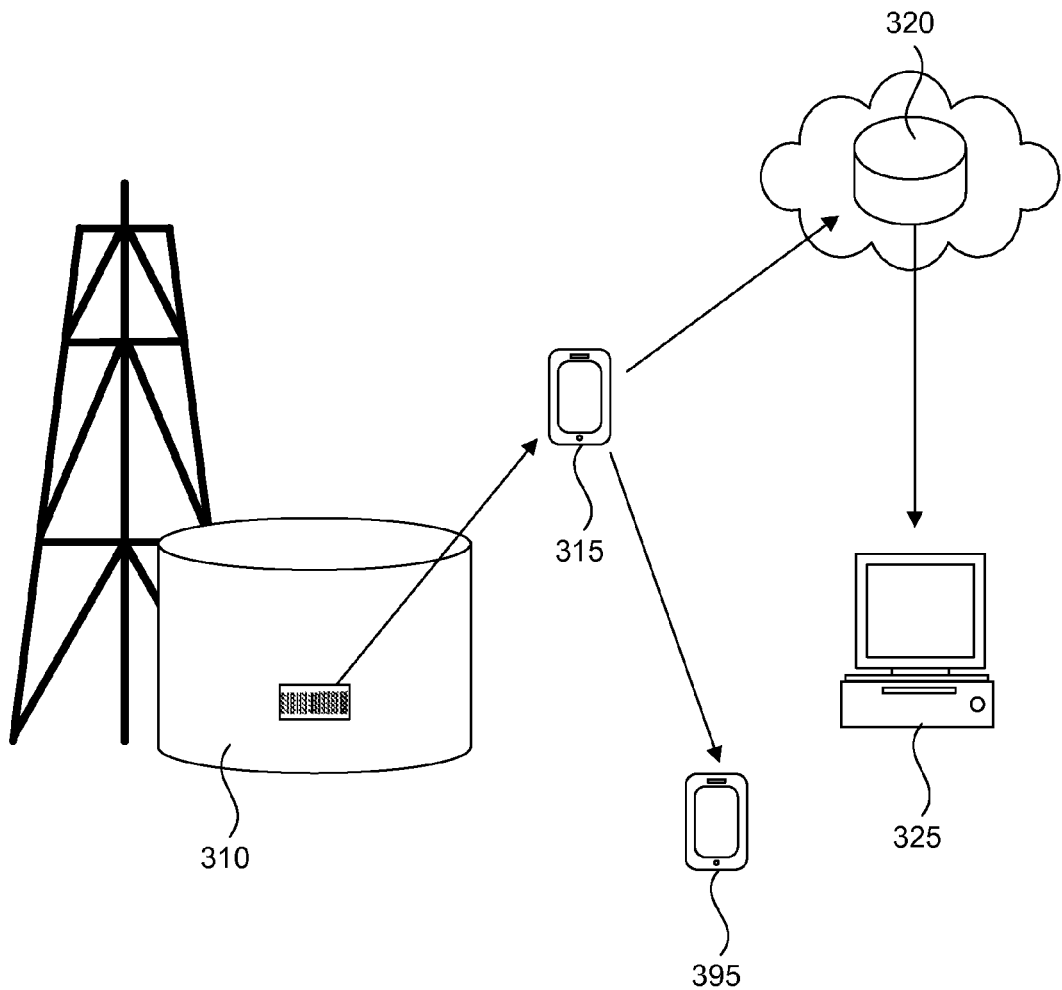
FIG. 3 is a schematic overview of a system for populating electronic run ticket data at an oil lease using a mobile device, transmitting the electronic run ticket data to a remote data store, and accessing the electronic run ticket data from a workstation in accordance with an example of the present technology.

FIG. 3 is a diagram illustrating a flow of data from the oil field to the mobile device to a data store in the cloud to a workstation or other client from which the data is accessed and/or managed. As has been described, software on a mobile device 315 may facilitate scanning of data at an oil lease, such as a barcode on a tank 310, and the data may be subsequently submitted for delivery to a remote server and/or data store 320, as well as to computing devices or workstations 325 for relevant parties, such as via a push notice sent to the producer's pumper or to a mobile device 395 for a relevant party. The electronic run ticket technology may comprise an integrated mobile and secure cloud data storage system. The software may provide real-time data to users and customers. The technology may be designed to accommodate operations in remote areas. For example, while wireless data may be available in an increasing number of areas, the ability to transmit such data in remote areas often decreases for more remote areas. Wireless mobile data connections may be unavailable at some leases. Thus, there may be a delay from when the transaction occurs to when the data is uploaded. To ensure security of the data, the data may be encrypted and generally inaccessible to users of the mobile device, including, in some examples, the originator of the data (e.g., the truck driver). Furthermore, when uploading electronic run ticket data, the data may be encrypted and uploaded to secure servers. The encryption process may restrict the ability of hackers or others to access the data from the mobile device, the wireless transmission, the secure server, or any other portion of the process.

In an example implementation, security for the system may be provided through the use of the authentication code described previously. Each user may be assigned a unique authentication code or key that may be used in the initial activation of the device. The authentication code may be limited to a single use when the mobile device sends a request for authentication. After the device has been authorized, the device may encrypt a unique key for the user and a unique key for the application, as well as a date or time value in UTC (Coordinated Universal Time). Each mobile device running the application may have a unique key. The present technology may allow for some web service methods to be secured (including registration or device activation methods), without having given a user a unique key in advance.

If there is a third party between the mobile device and the internet and the third party is tracking the information sent and received (such as by using a web proxy, for example), the third party may have access to the same information as the mobile device for up to a maximum of 10 seconds, 100 seconds or some other time interval (which may be more or less in actual practice depending on the time provider at the cellular service level).

Each user and application may have a unique key assigned thereto which may be generated randomly. When submitting a request to the management server to synchronize, upload, or download data, the unique key may be encrypted along with a number of ticks (e.g., nanoseconds) since a particulate date in time in the past. The number of ticks may be a timestamp. The management server may decrypt the request to obtain the key and the number of ticks. If enough ticks have gone by since the request was made, the management server may deny or reject the request. In other words, the 10 seconds, 100 seconds or other interval mentioned above may be a delay of time within which range a difference in the number of ticks will beconsidered acceptable. For example, when a driver connects to a third-party WiFi hotspot, a malicious entity could log transmitted data and see packet headers in an attempt to perform a replay attack to the management server. The timeout prevents replay attacks from using a same request that the client made.

The services enabling the present technology may be provided using a commercial cloud computing platform. Services, websites and the like may use a secure socket layer (SSL) certificate for increased security.

The technology may include an application framework model by which any number of roles may be created for a given application. Each user may be assigned any given number of roles (Admin, User, etc.) and a single status for application access (Active, Disabled, etc.) for each application within the framework. Each Application that an individual user registers may use a separate and unique key, uniquely identifying each user. Access to any user may be revoked by changing the user's application status to 'disabled'. In other words, even without access to the user's device, access may be revoked and the user may no longer be able to submit data to the server until and unless the application status is changed. Furthermore, when the device attempts to synchronizes data with the server, the server may lock the user out of the application on the device until the application status has changed.

In some examples, the server may provide a graphical user interface with information from the submitted electronic run tickets. For example, a details button may be used to provide further information for a given run ticket. Run tickets may be queried by a date range, user identification, purchaser or any other suitable data included in the run tickets. Selecting run tickets on a server side run ticket application may list the current status of any submitted mobile application run tickets. For example, the status may indicate whether a run ticket is expected to be uploaded, whether the pumper has verified the data, whether the run ticket has been delivered to, viewed by, or approved by the appropriate entities, whether any concerns noted in remarks by the driver have been addressed and so forth. The server side run ticket application may provide various aspects of data management. Real-time reports may be available for download in a variety of suitable formats, such as text, CSV (comma-separated values), Exel, HTML or any other suitable format.

Each run ticket may represent a line item in the report. Each line item may report various details for regulatory compliance and management purposes. Various report data may be available to involved parties and the available report data may differ for different parties depending on the extent of information relevant to the party's involvement in the process. Some information may be filtered out by user account type (e.g., producer, transporter, marketer and or level of authority within one of those entities). Some example information included in the report may include lease details, such as: field name, field operator, COC federal license, legal description, lease/pad name, county, state, tank number, tank capacity, tank strapping (STD/Actual), pumper name and signature, and pumper comment with date. The report may include run ticket details, such as: run ticket number, split ticket number (if applicable), ticket submit date, observed gravity and temperature, calculated net gravity, BS&W % and depth, opening feet/inches/fractions/temperature, closing opening feet/inches/fractions/temp, opening and closing barrels (standard & actual), gross barrels, net-calculated barrels, real-time ticket status (bought/rejected), purchasing company and so forth. The report may further include scanned seal numbers, such as: sales vale open, sales valve close, production valve open, production valve close, production valve equalizing, equalizing valve open, equalizing valve close, equalizing valve equalizing seal numbers. The report may also include transporter details, such as: trucking company, driver name, driver signature, bill of lading number, driver comment at lease, and driver comment at delivery. In one example, a report may be generated that approximates a conventional run ticket using data from the electronic run ticket. Furthermore, because the user signature is stored, as has been described previously, the user signature may be included on the approximation rather than an indication of a digital signature, which may optionally be a method of signing run ticket data according to the present technology. For example, the digital signature may be entered upon receipt of a user PIN or other credentials.

It is noted that while conventional run ticket processing involves manual reference to various printed data or conversion tables, calculations or derivations from recorded data, as well as lookups and other operations, according to the present technology may be performed electronically, such as at the mobile device.

The present technology, with both front-end and back-end systems, may provide benefits to the involved parties. Real time data may be transferred seamlessly between partner entities. Digitized data may be directly transferable into existing data systems. Digital data may be quickly searched, queried and analyzed. Efforts and delays associated with manual entry of paper records may be eliminated. Back office personnel may focus efforts on data trend analysis and anomaly detection instead of manual data entry. The present technology may facilitate error reduction by reducing or eliminating erroneous, missing, or illegible data.

After a transaction has been completed, the mobile and/or server side applications may use notifications for a variety of purposes, such as to: remind the truck driver to upload the data if the upload has not been completed automatically or within a predetermined period of time; to send an alert or push notice to the pumper when the ticket is submitted since the producer's pumper may be required by the BLM to view and approve the transaction within 48 hours; to notify the trucking company or purchaser that the transaction has been completed; and for any of a variety of other conceivable purposes. In some examples, the pumper may manage distribution or use of oil among a plurality of tanks to ensure that tanks do not go completely empty or become full. The use of push notifications may enable the pumper to more quickly respond to changing tank conditions and oil levels, in some cases before the truck driver has even left the lease. Notification may be provided using any of a variety of technologies, such as text message, email, instant message, voice message or other audio notification, and so forth.

Oil producers may bulk import/export lease location and tank information from the server side application. For example, the producer, or any other entity, may download run ticket data for a period of time, such as a week, a month or more, at a time. Data in a cloud-based or remote data store may be automatically transmitted to producers or other relevant parties at predetermined time intervals or may be automatically downloaded or retrieved by the producers, etc. at predetermined time intervals. For example, data may be downloaded daily at midnight to ensure availability of up-to-date data for the producer's employees when a workday begins. The cloud data store, or the data available in the cloud data store, may also be integrated or integratable with tax, accounting and other forms of software. This software may be first-party or third-party software. In some examples, rather than integrating the data store with other software, the data available through the data store may be formatted to be usable with any of a variety of software products.

The server side application may allow administrators to enable or disable truck driver access to data, use of the mobile application and so forth from an administrator console. Also, it is noted that while the present technology is described primarily in the context of the oil industry, the technology may be applied to any of a variety of other industries, such as a water hauling industry, for example.

Figure 4:
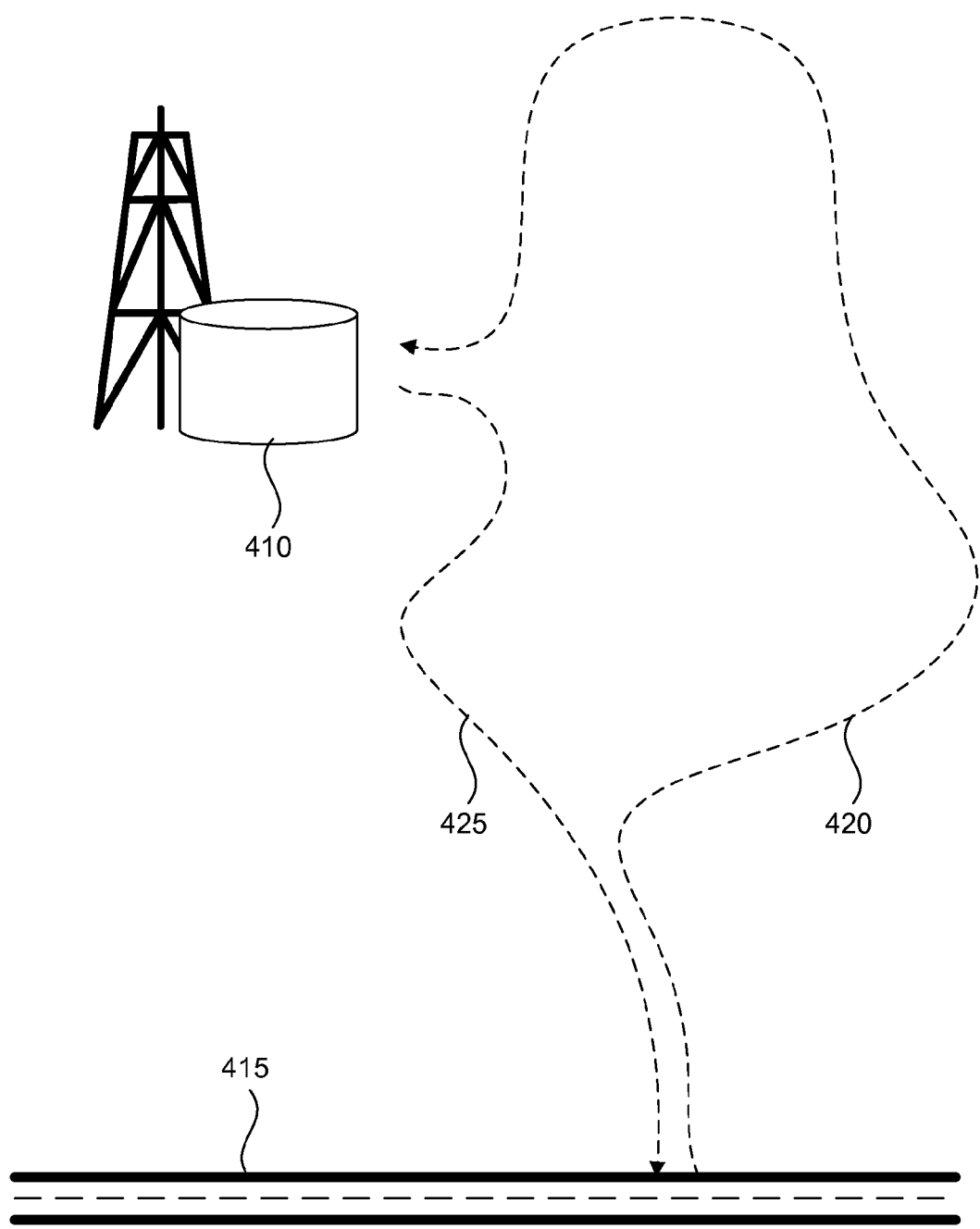
FIG. 4 is a schematic overview of tracking of a navigation path to and from a destination tank in accordance with an example of the present technology.

FIG. 4 illustrates a diagram including a main road 415 and a tank 410 on an oil lease removed from the main road. If a driver is unfamiliar with the oil lease, navigating to a particular tank or to a particular location on the lease may sometimes be inefficient and indirect. The present technology may utilize a global positioning system (GPS) device in the mobile device or in communication with the mobile device to track a path 420 a driver may take to reach the tank and/or a path 425 the driver may take to return to the highway. Tracking the path to the tank may be of limited value in instances where the navigation is inefficient and the driver readily recognizes a route to return from the tank. However, in some instances where the path is convoluted or difficult, the route may be tracked to assist the driver in finding the way back from the tank.

Tracking the path from the tank to the highway may be of value to drivers. Often, while a driver may be unsure of the precise destination location, resulting in a less direct route to the tank, the driver may be confident of how to best return to the main road from cues picked up from previously driving to the destination. Thus, the return route may be useful in providing directions to subsequent drivers in reaching the destination. The mobile application may provide navigation instructions in reverse from the path recorded. In this manner, the driver may efficiently navigate from the endpoint of the path (e.g., the turnoff from the main road) to the destination tank (e.g., the starting point of the path).

Even for instances where navigation instructions are provided to the driver for reaching the destination, the return route may still be tracked in order to determine whether this subsequent driver has identified a better or more efficient return route, such as one involving less travel time, less turns or other complexity, and so forth. In this manner a data store of optimal paths may be recorded and identified for use by future drivers.

Figure 5:
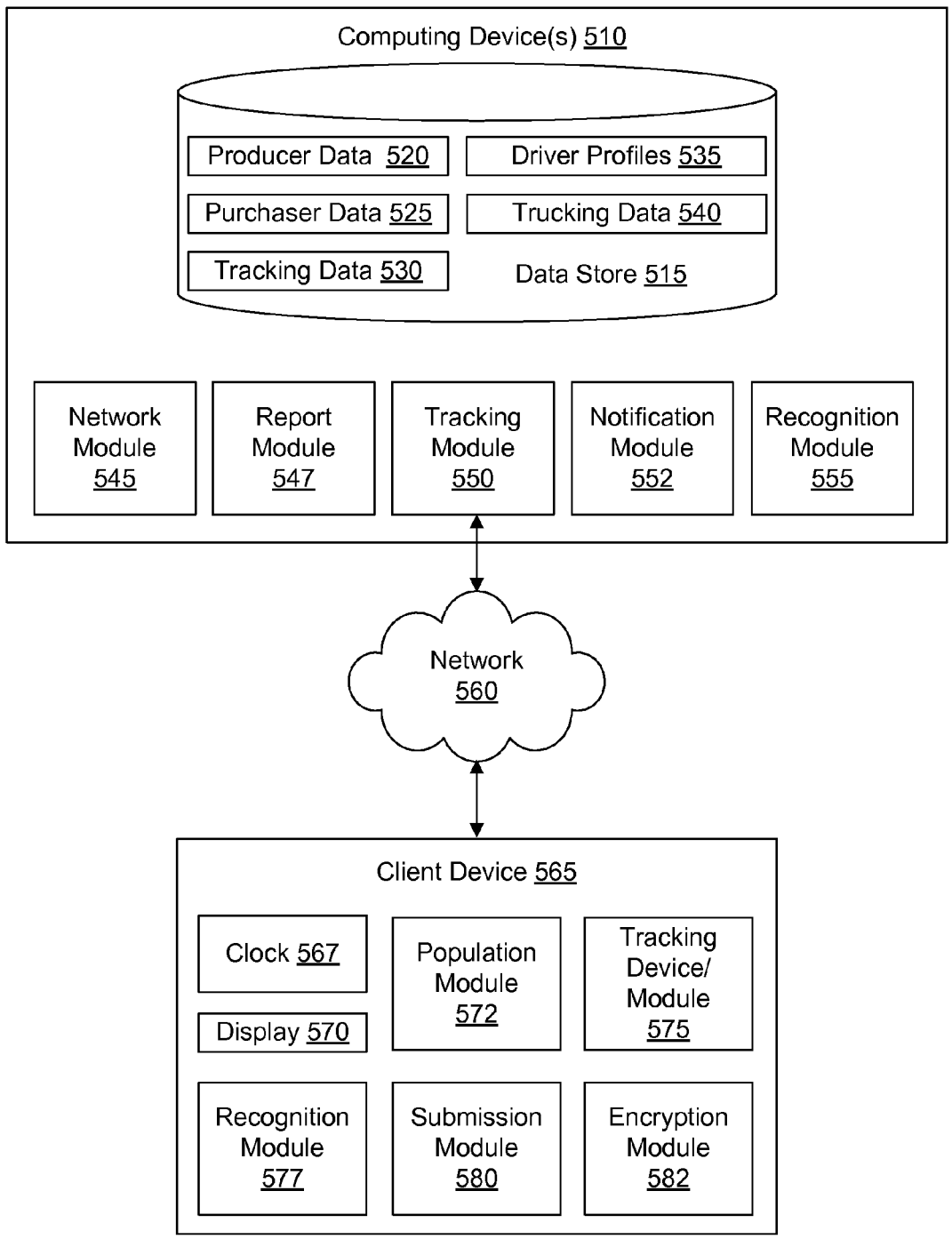
FIG. 5 is a block diagram of a system for managing electronic run ticket data in accordance with an example of the present technology.

Referring now to FIG. 5, a block diagram of a system for grouping messages from message senders is illustrated in accordance with an example of the present technology. The system may be implemented on one or more computing devices 510, such as a server for example, and/or client devices 565 and may be implemented using a network 560. The system may include a data store 515 and a number of modules 545, 547, 550, 552, 555, 572, 575, 577, 580, 582 for storing and processing electronic run ticket data.

The data store 515 may include, for example, an electronic run ticket data store, driver profiles (including credentials and the like), producer data, purchaser data, trucking company data, tracking data and so forth. While these various bodies of data are illustrated as being associated with a single data store, the data may be stored in a plurality of data stores as may be understood by one having skill in the art. The data in the data store may be structured for suitable display on a client device's 565 display 570 via a browser and/or other content access application, such as in the form of a webpage or website with a graphical user interface for viewing, interacting with, modifying, creating or deleting data.

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The server side application may include a variety of modules, such as a network module 545 to identify available communication networks and transmit or receive data to and from client devices. The server side application may further include a report module 547 to generate reports based on data in the data store to provide to the involved parties, with different reports including access to different segments of data, as has been described. The server side application may further include a tracking module 550 to record incoming tracking data for tracking the location or navigation of a driver and to store the incoming tracking data to the tracking data store. The tracking module may also be configured to push the tracking data to connected client devices using the network module to make the tracking data available to the client devices. The server side application may also include a notification module 552 to notify drivers, pumpers, producers and so forth with the notifications that have been described previously.

The client device 565 may include a clock 567 for identifying the time at which a transaction occurs and providing a time stamp to the electronic run ticket application. The client device may also include a population module 572 to populate the various data fields of the electronic run ticket based on received data, such as from scanning, manual input and so forth. The application on the client device may further include an encryption module 582 to encrypt the electronic run ticket data, a submission module 580 to submit the electronic run ticket data over the network, a tracking device and/or tracking module 575 to track a position or navigation of the driver, and a recognition module 577 for recognizing or capturing images for recognition of handwritten data, barcode data and so forth.

The recognition module 555 or 577, whether on the server side (555) or the client side (577), may be configured to analyze image, barcode, handwriting, text or other data for recognition to identify characteristics of the data. For example, the recognition module may perform optical mark recognition or optical character recognition operations to identify handwriting or other data captured using a camera of the client device or otherwise input to the client device. In one example, the server side recognition module 577 may be used in a machine learning process. The recognition module may perform machine learning operations on the images and other data, such as in order to better learn handwriting patterns for handwritten data.

Machine learning may be an effective tool for use in optimizing pattern recognition. Machine learning may take empirical data as input, such as known handwriting patterns, for example, and may yield patterns (e.g., predictions) which may be representative of the underlying mechanism or interaction process that resulted in the generation of the patterns. Machine learning systems may take advantage of data to capture characteristics of interest having an unknown underlying probability distribution. Machine learning may be used to identify possible relations between observed variables, such as to recognize complex patterns and to make machine decisions based on input data. In some examples, machine learning systems may generalize from the available data to produce a useful output, such as when the amount of available data is too large to be used efficiently or practically.

Machine learning may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure.

Example client devices 565 for the system of FIG. 5 may include, but are not limited to, a laptop or notebook computer, a tablet, a cell phone, a smart phone, a hand held messaging device, a set-top box, a gaming console, a personal data assistant, an electronic book reader, heads up display (HUD) glasses, a car navigation system, or any device with a display 570 that may receive and present the data for purposes of the present technology.

The system may be implemented across one or more computing device(s) 510, 565 connected via a network 560. For example, a computing device 510 may include a data store 515 and various engines and/or modules such as those described above and such modules may be executable by a processor of the computing device 510.

The modules that have been described may be stored on, accessed by, accessed through, or executed by a server computing device 510 or a client computing device 565. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various embodiments, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various applications and/or functional entities described. The components executed on the computing device may include the modules described, as well as various other applications, services, processes, systems, engines or functionality not discussed in detail herein.

The client device 565 shown in FIG. 5 may be representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device may include a respective display 570. The display may comprise, for example, one or more devices such as cathode ray tubes (CRTs), liquid crystal display (LCD) screens, gas plasma based flat panel displays, LCD projectors, or other types of display devices, etc.

Each client device may be configured to execute various applications such as a browser, a respective page or content access application for an online retail store and/or other applications. The browser may be executed in a client device, for example, to access and render content pages, such as web pages or other network content served up by the computing device 510 and/or other servers. The content access application may be executed to obtain and render for display content features and messaging features from the server or computing device, or other services and/or local storage media.

In some embodiments, the content access application may correspond to code that is executed in the browser or plug-ins to the browser. In other embodiments, the content access application may correspond to a standalone application, such as a mobile application. The client device may be configured to execute applications beyond those mentioned above, such as, for example, mobile applications, email applications, instant message applications and/or other applications. Users at client devices may access content features through content display devices or through content access applications executed in the client devices.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 6:
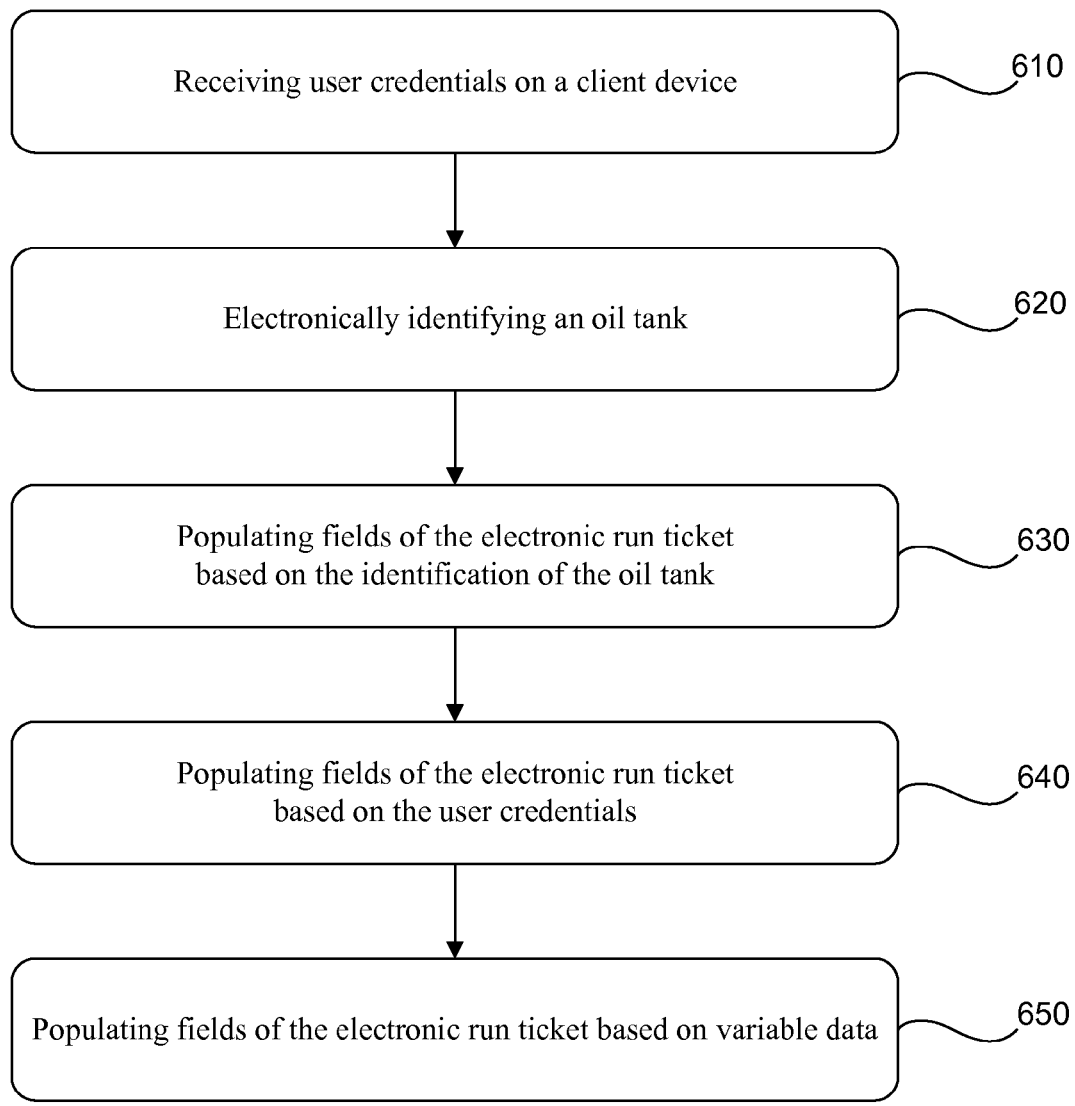
FIGS. 6-7 illustrate methods for completing electronic run tickets in accordance with examples of the present technology.

Referring now to FIG. 6, a flow diagram of a method is illustrated for completing an electronic run ticket in accordance with an example of the present technology. The method may include receiving 610 user credentials on a client device. The user credentials may include any of a variety of types of information, such as username, password, PIN, authentication code, email address, name and so forth. The method may include electronically identifying 620 an oil tank and populating 630 fields of the electronic run ticket based on the identification of the oil tank. For example, the oil tank may be identified by scanning a barcode at the oil tank. The method may include populating 640 fields of the electronic run ticket based on the user credentials as well as populating 650 fields of the electronic run ticket based on variable data. For example, the variable data may include time, oil depth, oil temperature, BS&W %, and so forth. Populating the fields of the electronic run ticket with the variable data may include adding a time stamp to the electronic run ticket, electronically receiving data from a centrifuge device, scanning handwritten depth and temperature data, and so forth.

In one example, the method may include detecting an ambient temperature using the client device. Additionally, a temperature of oil in the oil tank may be detected if a thermometer electronically connected to the client device is used to measure the temperature. A thermometer may be integrally formed with the client device or may be electronically coupleable to the client device to enable the client device to detect ambient temperature, oil temperature and so forth. For example, digital thermometers may be coupled to the client device using wired or wireless connections, including but not limited to Bluetooth, WiFi and so forth.

The client device may be configured to calculate a volume of oil in the oil tank based on the temperature and an API (American Petroleum Institute) gravity of the oil. The client device may be further configured to calculate the volume of the oil when the temperature of the oil is different than a standard temperature for the API gravity of the oil to adjust the temperature to the stand temperature.

In one example, the method may include electronically identifying a legal load capacity of a truck and calculating a volume of oil to remove from the oil tank to fill the load capacity. The client device may store the load capacity of the truck and the volume of oil to remove from the tank or may calculate the volume of oil to remove from the tank based on the load capacity.

The method may include tracking movement of the client device to or from the oil tank using a global positioning system (GPS) that may be integrally formed with the client device or electronically coupled to the client device, wired or wirelessly. The tracked movement of the client device may be stored for display as navigation instructions for a second client device. Additionally, navigation instructions for getting to the oil tank based may be provided to a second device based on the reverse tracked movement of the client device from the oil tank.

In one example implementation, the oil tank, or at least an oil lease, may be identified by comparing a GPS coordinate of the client device to a data store including GPS coordinates of a plurality of different oil tank locations. The oil tank may thus be identified based on the GPS coordinates of the client device. For oil fields with a large number of tanks, particularly with tanks more closely spaced, current consumer grade GPS devices such as may be included in smartphones and the like may be unable to resolve individual tank locations with sufficient accuracy, but more general information about the lease as a whole may be identified and populated based on the GPS coordinates. Additionally, as GPS device accuracy improves, and the ability to resolve individual tank locations becomes feasible, the identification functionality may be extended to identify individual tanks based on the GPS coordinates. Also, the client device may receive identification of an oil tank through a user interface after resolving a lease or oil field identification. For example, when the GPS device identifies that the client device is at a particular lease, the user may be prompted to select a tank from which oil will be drawn from a list of tanks available at the identified lease.

Other example implementations for identifying the oil tank may include scanning a bar code on the oil tank using the client device, receiving input of an identification number of the oil tank to the client device and comparing the input to a data store including identification numbers of a plurality of oil tanks to identify the oil tank, detecting the identification of the oil tank using any of a variety of radio wave communications (some examples of which have been previously mentioned, including NFC, RFID, ZigBee and so forth), as well as through the use of other technologies.

In some instances, an individual oil tank may not include sufficient oil to fill a truck load capacity and oil may be drawn from a plurality of tanks In such an example, the method may include associating run tickets for a plurality of oil tanks when a truck leases oil from the plurality of oil tanks.

Figure 7:
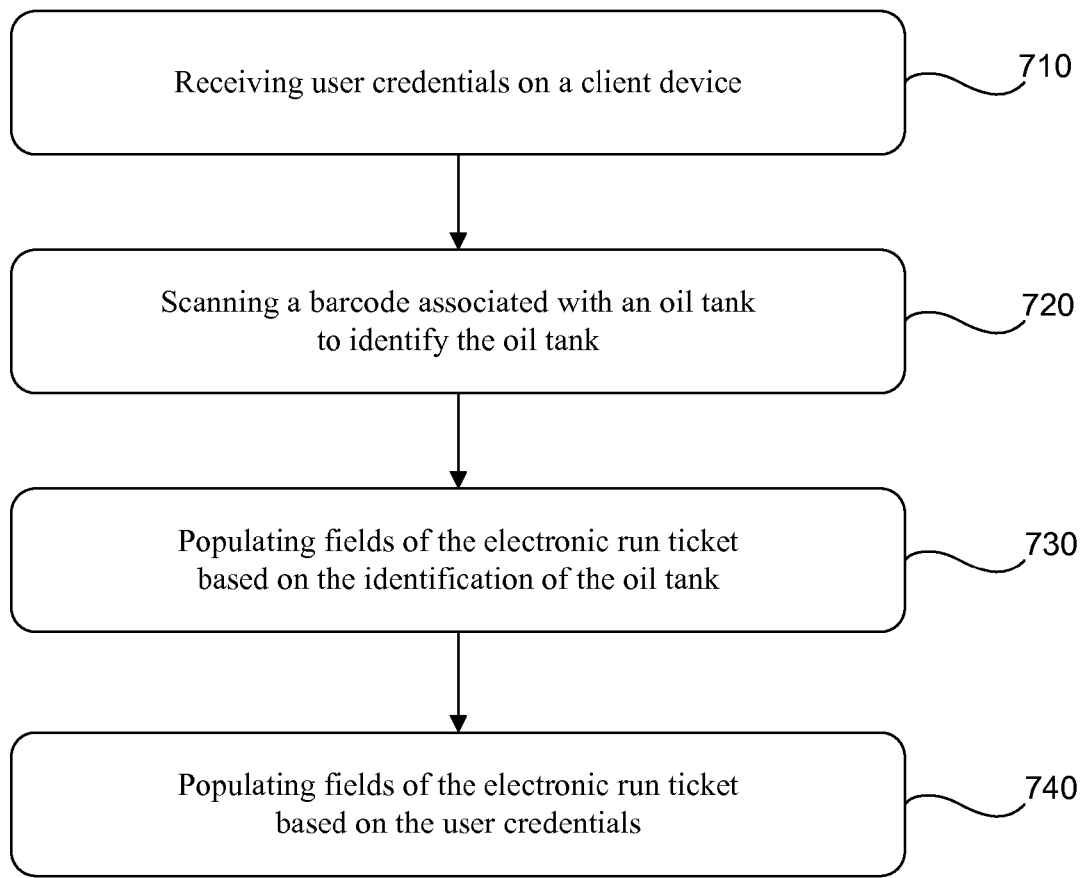

Referring now to FIG. 7, a flow diagram of a method for completing an electronic run ticket is illustrated in accordance with an example of the present technology. The method may include receiving 710 user credentials on a client device, scanning 720 a barcode associated with an oil tank to identify the oil tank, and populating 730, 740 fields of the electronic run ticket based on the identification of the oil tank and the user credentials. Additionally, the method may include scanning barcodes on valve seals to enter opening, closing, and equalizing valve seal numbers.

In some examples, this or other methods described herein may be implemented wholly or partially as computer readable program code executed by a processor and the computer readable code may be embodied on a non-transitory computer usable medium.

Figure 8:
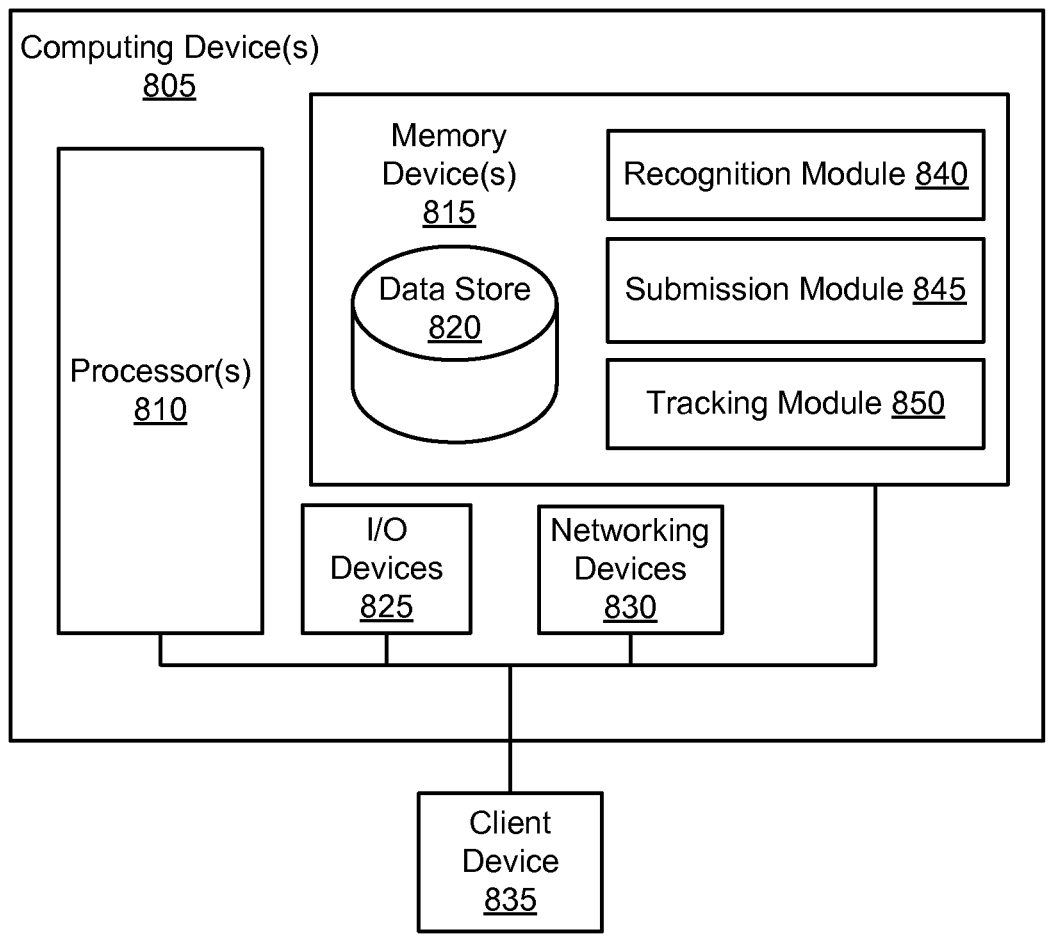
FIG. 8 is a block diagram of a computing system for completing an electronic run ticket in accordance with an example of the present technology.

FIG. 8 illustrates a computing device 805 on which services or modules of this technology may execute. The computing device may include one or more processors 810 that are in communication with memory devices 815. The computing device may include a local communication interface 825 for the components in the computing device. For example, the local communication interface may be a local data bus and/or any related address or control busses as may be desired.

The memory device may contain modules (i.e., recognition module 840, submission module 845, and tracking module 850, as have been described previously) that are executable by the processor(s) and data for the modules. A data store 820 may also be located in the memory device for storing data related to the modules and other applications along with an operating system that is executable by the processor(s).

The computing device may further include or be in communication with a client device 835, which may include a display device. The client device may be available for an administrator to use in interfacing with the computing device, such as to review and manage electronic run ticket data.

Various applications may be stored in the memory device and may be executable by the processor(s). Components or modules discussed in this description that may be implemented in the form of software using high programming level languages that are compiled, interpreted or executed using a hybrid of the methods.

The computing device may also have access to I/O (input/output) devices 825 that are usable by the computing devices. An example of an I/O device is a display screen that is available to display output from the computing devices. Other known I/O device may be used with the computing device as desired. Networking devices 830 and similar communication devices may be included in the computing device. The networking devices may be wired or wireless networking devices that connect to the internet, a LAN, WAN, or other computing network.

The components or modules that are shown as being stored in the memory device may be executed by the processor. The term "executable" may mean a program file that is in a form that may be executed by a processor. For example, a program in a higher level language may be compiled into machine code in a format that may be loaded into a random access portion of the memory device and executed by the processor, or source code may be loaded by another executable program and interpreted to generate instructions in a random access portion of the memory to be executed by a processor. The executable program may be stored in any portion or component of the memory device. For example, the memory device may be random access memory (RAM), read only memory (ROM), flash memory, a solid state drive, memory card, a hard drive, optical disk, floppy disk, magnetic tape, or any other memory components.

The processor may represent multiple processors and the memory may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A method for completing an electronic run ticket, comprising:
   authenticating the client device with a management server by sending an authentication code from the client device to the management server;
   receiving a unique key at the client device from the management server for identifying the client device after authenticating the client device;
   electronically identifying a tank by capturing identifying information using the client device;
   recognizing, by the client device, captured data as identifying information;
   populating data fields of the electronic run ticket based on the identifying information;
   encrypting the electronic run ticket with the unique key to obtain an encrypted electronic run ticket; and
   transmitting the encrypted electronic run ticket to the management server.

2. The method of claim 1, further comprising populating fields of the electronic run ticket based on variable data, wherein the variable data comprises time and populating the fields of the electronic run ticket comprises adding a time stamp to the electronic run ticket.

3. The method of claim 1, further comprising populating fields of the electronic run ticket based on variable data, wherein the variable data comprises a temperature.

4. The method of claim 3, further comprising detecting an ambient temperature or a temperature of oil in the tank using the client device.

5. The method of claim 3, further comprising calculating a volume of oil in the tank based on the temperature and an API (American Petroleum Institute) gravity of the oil.

6. The method of claim 5, further comprising calculating the volume of the oil when the temperature of the oil is different than a standard temperature for the API gravity of the oil.

7. The method of claim 1, further comprising electronically identifying a legal load capacity of a truck and calculating a volume of oil to remove from the tank to fill the load capacity.

8. The method of claim 1, further comprising tracking movement of the client device from the tank using a global positioning system (GPS).

9. The method of claim 8, further comprising storing tracked movement of the client device for display as navigation instructions for a second client device.

10. The method of claim 1, wherein the authentication code is a single use authentication code.

11. The method of claim 1, wherein electronically identifying the tank further comprises comparing a GPS coordinate of the client device to a data store including GPS coordinates of a plurality of different tank locations and identifying the tank based on the GPS coordinate of the client device.

12. The method of claim 1, wherein electronically identifying the tank further comprises scanning a bar code on the tank using the client device, the method further comprising identifying a valve seal by scanning a bar code on a valve for the tank using the client device.

13. The method of claim 1, wherein capturing identifying information further comprises receiving manual input of an identification number of the tank to the client device, and recognizing, by the client device, captured data as identifying information further comprises comparing the manual input to data in a data store storing identification numbers of a plurality of tanks to identify the tank.

14. The method of claim 1, wherein capturing identifying information further comprises detecting the identifying information of the tank using radio wave communications.

15. The method of claim 1, further comprising associating run tickets for a plurality of tanks when a truck leases oil from the plurality of tanks.

16. An electronic run ticket system, comprising:
   a client computing device;
   detection hardware associated with the client computing device for electronically detecting an identification of an oil tank by capturing identifying information using the client computing device;
   a memory on the client computing to store user credentials;
   a clock on the client computing device to identify time stamp data;
   a population module to recognize, by the client computing device, captured data as identifying information, and to populate an electronic run ticket based on the identification of the oil tank, the user credentials and the time stamp data;
   a submission module for submitting an authentication code from the client device to a management server to authenticate the client device with the management server; and
   an encryption module configured to encrypt the electronic run ticket with a unique key received from the management server.

17. The system of claim 16, wherein the client computing device comprises a GPS unit to identify a location of the client computing device, the GPS unit to track movement of the client device to the oil tank and store the tracked movement of the client device for display as navigation instructions.

18. The system of claim 16, further comprising a recognition module to recognize handwritten data, the population module being further configured to populate the electronic run ticket based on recognition of the handwritten data by the recognition module.

19. The system of claim 16, wherein the detection hardware comprises a camera, a scanner or a radio communication device.

20. A method for completing an electronic run ticket, comprising:
   authenticating the client device with a management server by sending an authentication code from the client device to the management server;
   receiving a unique key at the client device from the management server for identifying the client device after authenticating the client device;
   electronically identifying an oil tank by scanning a code associated with an oil tank using the client device;
   recognizing, by the client device, the code as identifying information;
   populating fields of the electronic run ticket based on the identifying information; and
   encrypting the electronic run ticket with the unique key to obtain an encrypted electronic run ticket.

* * * * *